US012155156B2

(12) United States Patent
Li et al.

(10) Patent No.: US 12,155,156 B2
(45) Date of Patent: Nov. 26, 2024

(54) CONNECTOR, CONNECTION ASSEMBLY, AND BACKPLANE INTERCONNECTION SYSTEM

(71) Applicant: HUAWEI TECHNOLOGIES CO., LTD., Guangdong (CN)

(72) Inventors: Wenliang Li, Shenzhen (CN); Jun Chen, Dongguan (CN); Tinghe Wu, Dongguan (CN); Shuang Qiu, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 347 days.

(21) Appl. No.: 17/695,462

(22) Filed: Mar. 15, 2022

(65) Prior Publication Data

US 2022/0209471 A1 Jun. 30, 2022

Related U.S. Application Data

(63) Continuation of application No. PCT/CN2020/106515, filed on Aug. 3, 2020.

(30) Foreign Application Priority Data

Sep. 17, 2019 (CN) ......................... 201921544553.8

(51) Int. Cl.
*H01R 13/6587* (2011.01)
*H01R 12/00* (2006.01)
(Continued)

(52) U.S. Cl.
CPC ....... *H01R 13/6587* (2013.01); *H01R 12/716* (2013.01); *H01R 13/652* (2013.01)

(58) Field of Classification Search
CPC ........................... H01R 12/585; H01R 12/716; H01R 13/6471; H01R 13/652; H01R 13/6587; H01R 13/6588; H01R 13/6594
See application file for complete search history.

(56) References Cited

U.S. PATENT DOCUMENTS 6,347,962 B1 * 2/2002 Kline ................ H01R 13/6471 439/607.09
7,955,130 B2 * 6/2011 Liu .................... H01R 13/6594 439/607.11
(Continued)

FOREIGN PATENT DOCUMENTS

CN 201430243 Y 3/2010
CN 202231243 U 5/2012
(Continued)

*Primary Examiner* — Abdullah A Riyami
*Assistant Examiner* — Thang H Nguyen
(74) *Attorney, Agent, or Firm* — WOMBLE BOND DICKINSON (US) LLP

(57) ABSTRACT

A connector includes an insulation base, a terminal array, a metal shielding piece, and a first common grounding conductor (CGC). The insulation base has two surface. The terminal array is fastened on the insulation base and includes many row of terminals. Each row of terminals includes a signal terminal and a ground terminal, both which penetrate the insulation base, and a metal shielding piece is between two adjacent rows of terminals. The first CGC is on one surface, two through holes (THs) are on the first CGC, the signal terminal penetrates the first TH and is insulated from an inner wall of the first TH, the ground terminal penetrates the second TH and is in contact with and conducted with at least a part of an inner wall of the second TH, and the metal shielding piece is in contact with and conducted with the first CGC.

20 Claims, 8 Drawing Sheets

(51) Int. Cl.
*H01R 12/71* (2011.01)
*H01R 13/652* (2006.01)

(56) References Cited

U.S. PATENT DOCUMENTS

| | | | | | |
|---|---|---|---|---|---|
| 9,985,389 | B1 * | 5/2018 | Morgan | H01R 13/6471 | |
| 10,186,811 | B1 * | 1/2019 | Trout | H01R 13/428 | |
| 11,996,656 | B2 * | 5/2024 | Wang | H01R 13/518 | |
| 2005/0215120 | A1 * | 9/2005 | Tokunaga | H01R 13/6583 | 439/607.09 |
| 2005/0215121 | A1 * | 9/2005 | Tokunaga | H01R 31/06 | 439/607.13 |
| 2010/0227503 | A1 * | 9/2010 | Liu | H01R 13/6585 | 439/607.09 |
| 2014/0127949 | A1 * | 5/2014 | Yu | H01R 12/58 | 439/660 |
| 2018/0109043 | A1 * | 4/2018 | Provencher | H01R 13/025 | |
| 2019/0036256 | A1 * | 1/2019 | Martens | H01R 13/658 | |
| 2019/0237911 | A1 * | 8/2019 | Munoz | H01R 13/6587 | |

FOREIGN PATENT DOCUMENTS

| | | | |
|---|---|---|---|
| CN | 109473805 | A | 3/2019 |
| CN | 109728456 | A | 5/2019 |
| EP | 1263088 | A1 | 12/2002 |
| EP | 2226903 | A1 | 9/2010 |

* cited by examiner

CONNECTOR, CONNECTION ASSEMBLY, AND BACKPLANE INTERCONNECTION SYSTEM

CROSS-REFERENCE TO RELATED APPLICATIONS

This application is a continuation application of International Patent Application No. PCT/CN2020/106515, filed on Aug. 3, 2020, which claims priority to Chinese Patent Application No. 201921544553.8, filed on Sep. 17, 2019. The disclosures of the aforementioned applications are hereby incorporated by reference in their entireties.

TECHNICAL FIELD

This application relates to the field of communications device technologies, and in particular, to connectors.

BACKGROUND

As a communication rate increases, a system imposes a higher requirement on a high-speed electrical performance of a connector. The most important electrical performance indicators are crosstalk, loss, and reflection. The crosstalk includes far-end crosstalk and near-end crosstalk. The crosstalk is represented as noise injection to a victim network, and directly reduces a signal-to-noise ratio of a signal. Consequently, signal transmission quality deteriorates. As a rate of a current mainstream communications product evolves to 56 Gbps or even 112 Gbps, the crosstalk gradually becomes one of main challenges to the connector.

SUMMARY

Embodiments of this application provide a connector, a connection assembly, and a backplane interconnection system, to reduce crosstalk of the connector.

To achieve the foregoing objective, the following technical solutions are used in the embodiments of this application.

According to a first aspect, embodiments of this application provide a connector, including an insulation base, a terminal array, a metal shielding piece, and a first common grounding conductor. The insulation base has a first surface and a second surface opposite to the first surface. The terminal array is fastened on the insulation base, the terminal array includes a plurality of rows of terminals, each row of terminals includes a signal terminal and a ground terminal, both the signal terminal and the ground terminal penetrate the insulation base, and a metal shielding piece is disposed between two adjacent rows of terminals. The first common grounding conductor is disposed on the first surface. A first through hole is disposed on the first common grounding conductor at a position corresponding to the signal terminal. The signal terminal penetrates the first through hole, and is insulated from an inner wall of the first through hole. A second through hole is disposed on the first common grounding conductor at a position corresponding to the ground terminal. The ground terminal penetrates the second through hole, and is in contact with and conducted with at least a part of an inner wall of the second through hole. The metal shielding piece is in contact with and conducted with the first common grounding conductor.

The connector provided in embodiments of this application includes the terminal array, the terminal array is fastened on the insulation base, and the terminal array includes the plurality of rows of terminals. Each row of terminals includes the signal terminal and the ground terminal. In this way, signal terminals in each row of terminals can be shielded from each other by using a ground terminal. When the connector is connected to a backplane or a board, the ground terminal is connected to a ground cable on the backplane or the board, to implement grounding and signal backflow. In addition, the metal shielding piece is disposed between the two adjacent rows of terminals, the first common grounding conductor is disposed on the first surface, the second through hole is disposed on the first common grounding conductor at the position corresponding to the ground terminal, the ground terminal penetrates the second through hole and is in contact with and conducted with at least a part of the inner wall of the second through hole, and the metal shielding piece is in contact with and conducted with the first common grounding conductor. Therefore, the metal shielding piece can be connected to the ground cable on the backplane or the board through the first common grounding conductor and the ground terminal, so that two adjacent rows of signal terminals can be shielded from each other by using the metal shielding piece. In addition, a relatively large quantity of contact and conduction regions can be formed between the ground terminal and the first common grounding conductor and between the metal shielding piece and the first common grounding conductor. In this way, the metal shielding piece has relatively good grounding and signal backflow performance, crosstalk between two adjacent rows of terminals is relatively low, and crosstalk of the connector is relatively low.

According to aspects of the present disclosure, a second common grounding conductor is further disposed on the second surface, a third through hole is disposed on the second common grounding conductor at a position corresponding to the signal terminal, the signal terminal penetrates the third through hole and is insulated from an inner wall of the third through hole, a fourth through hole is disposed on the second common grounding conductor at a position corresponding to the ground terminal, and the ground terminal penetrates the fourth through hole and is in contact with and conducted with at least a part of an inner wall of the fourth through hole. In this way, signal backflow is performed on the ground terminal by using two common grounding conductors (that is, the first common grounding conductor and the second common grounding conductor), so that signal backflow performance of the connector can be further improved.

In an embodiment, the metal shielding piece is embedded in the insulation base, an end that is of the metal shielding piece and that is close to the first surface is in contact with and conducted with the first common grounding conductor, and an end that is of the metal shielding piece and that is close to the second surface is in contact with and conducted with the second common grounding conductor. In this way, signal backflow is performed on the metal shielding piece by using two common grounding conductors (that is, the first common grounding conductor and the second common grounding conductor), so that signal backflow performance of the connector can be further improved.

In an embodiment, the metal shielding piece has one of a protrusion and a groove, the first common grounding conductor has the other of the protrusion and the groove, and the protrusion is cooperatively accommodated in the groove and is in contact with and conducted with an inner wall of the groove. In this way, an area of contact between the metal shielding piece and the first common grounding conductor can be increased, so that signal backflow performance of the connector is further improved.

In an embodiment, protection boards are disposed on at least two opposite sides of the terminal array, and the protection boards are fastened on the insulation base. In this way, the terminal array can be protected by using the protection board, to avoid scratching the terminal array.

In an embodiment, the protection board and the insulation base are integrally molded. In this way, the connector provided in embodiments of this application includes a relatively small quantity of components, and assembly efficiency is relatively high.

In an embodiment, both the signal terminal and the ground terminal are plug terminals, a plug direction of the signal terminal is consistent with that of the ground terminal, a guide structure is disposed on an inner surface of the protection board, and a guide direction of the guide structure is consistent with the plug direction of the signal terminal or the ground terminal. In this way, under guidance of the guide structure, the connector provided in embodiments of this application can be quickly inserted into another connector cooperating with the connector.

In an embodiment, the connector further includes an insulation and isolation piece, the insulation and isolation piece is cooperatively embedded in the first through hole, a fifth through hole is disposed on the insulation and isolation piece, and the signal terminal cooperatively penetrates the fifth through hole. In this way, insulation between the signal terminal and the inner wall of the first through hole is implemented by using the insulation and isolation piece, and insulation stability is relatively high.

In an embodiment, the insulation and isolation piece and the insulation base are integrally molded. In this way, the connector includes a relatively small quantity of components, and assembly efficiency is relatively high.

In an embodiment, in each row of terminals, signal terminals form a plurality of signal terminal groups, each signal terminal group includes at least one signal terminal, and a ground terminal is disposed between two adjacent signal terminal groups. In this way, signals transmitted by the two adjacent signal terminal groups are shielded from each other by using the ground terminal, signal crosstalk is reduced, and performance of the connector is improved.

In an embodiment, each signal terminal group includes two signal terminals. In this way, the signal terminal group can transmit two differential signals having equal amplitudes and opposite phases, and the differential signals have a strong anti-electromagnetic interference capability, so that anti-electromagnetic interference performance of the connector can be improved.

According to aspects of the present disclosure, embodiments of this application provide a connection assembly, including a first connector and a second connector. The first connector and/or the second connector are/is the connector described in any one of the foregoing technical solutions, and the first connector is cooperatively connected to the second connector.

Because the first connector and/or the second connector used in the connection assembly in embodiments of this application are/is the same as the connector described in any one of the foregoing technical solutions, the connectors can resolve a same technical problem and achieve a same expected effect.

According to a third aspect, embodiments of this application provide a backplane interconnection system, including a backplane, at least one board, and at least one connection assembly described in the foregoing technical solutions. Each board is connected to the backplane through at least one connection assembly.

Because the connection assembly used in the backplane interconnection system in embodiments of this application is the same as the connection assembly described in the foregoing technical solutions, the connection assemblies can resolve a same technical problem and achieve a same expected effect.

DESCRIPTION OF EMBODIMENTS

It should be noted that "and/or" in descriptions of embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiments of this application relate to a connector, a connection assembly, and a backplane interconnection system. The following briefly describes concepts in the embodiments.

Crosstalk: Electronically, crosstalk refers to coupling between two signal cables. This is because undesired inductive coupling and capacitive coupling may occur between signal cables that are close in space, resulting in mutual interference. The capacitive coupling causes a coupling current, and the inductive coupling causes a coupling voltage. Crosstalk is an urgent problem to be solved in printed circuit board designs and integrated circuit designs.

Signal terminal: A signal terminal is configured to transmit an electrical signal and is conductive.

Ground terminal: A ground terminal is configured to connect to the ground and is conductive.

Backplane: A backplane is an important part of a communications device. Usually, the backplane includes a multilayer printed board, a connector, a guide pin, and the like, and provides an electrical signal connection and physical support for each board or module in a system.

Board: A board includes a printed circuit board (PCB) and an electronic component (such as a chip, a resistor, or a capacitor) disposed on the printed circuit board.

Conduction: Conduction refers to a state in which a current can be transmitted between two parts.

Figure 1:
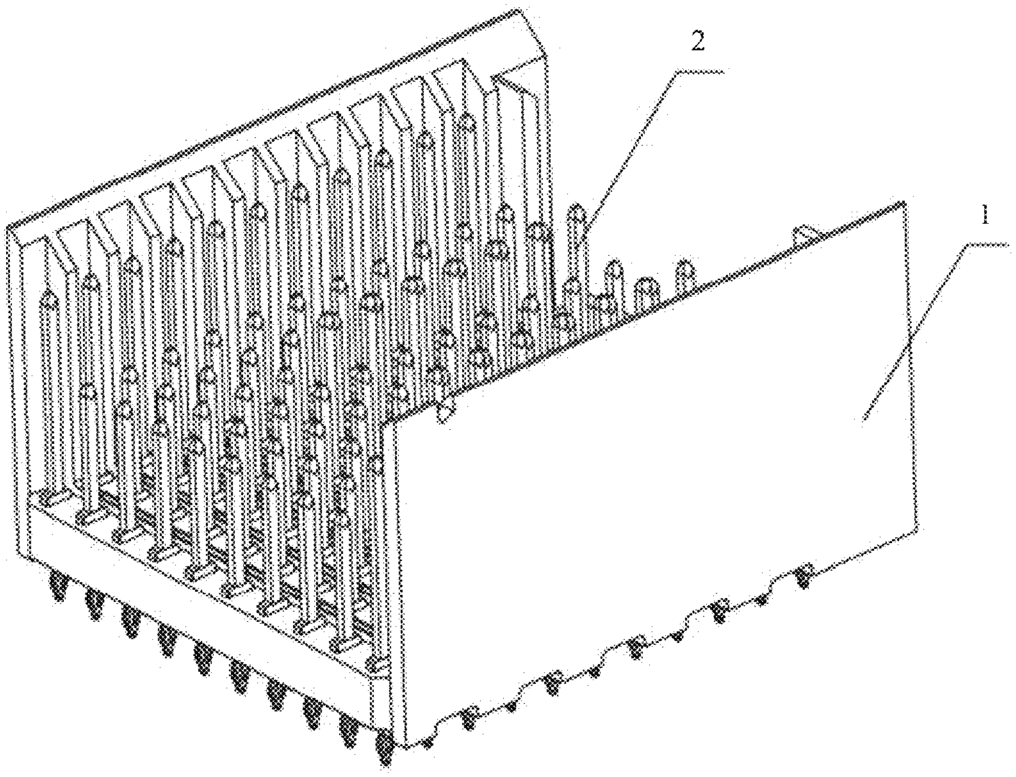
FIG. 1 is a schematic diagram of a structure of a connector
Figure 2:
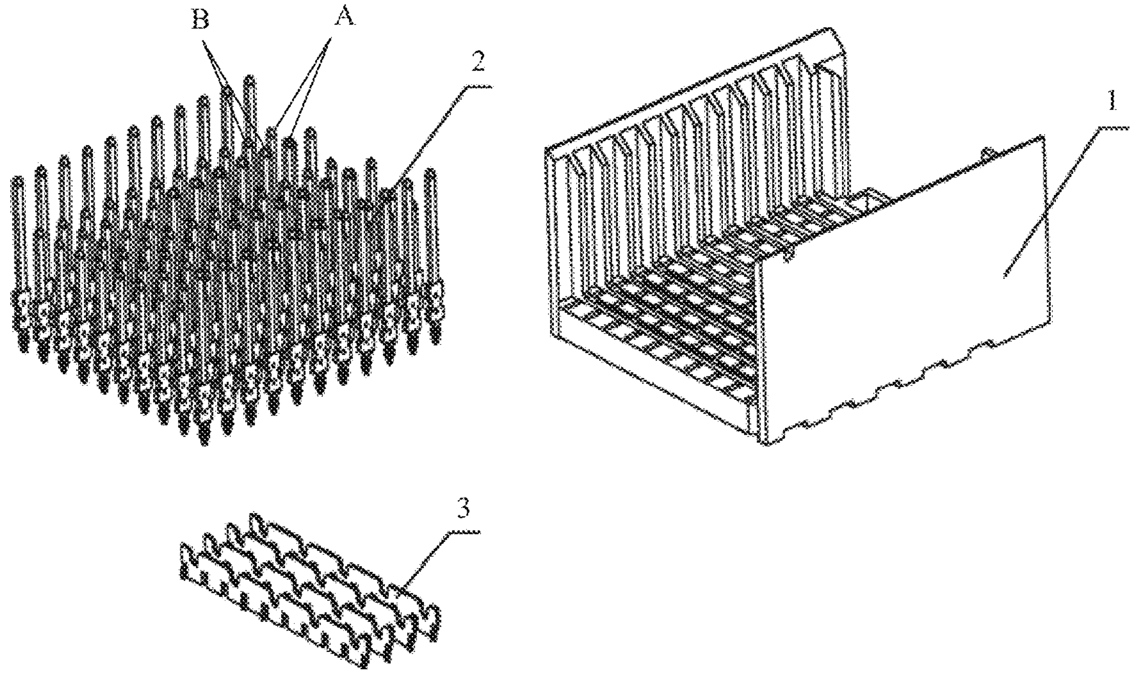
FIG. 2 is an exploded view of the connector shown in FIG. 1.
Figure 3:
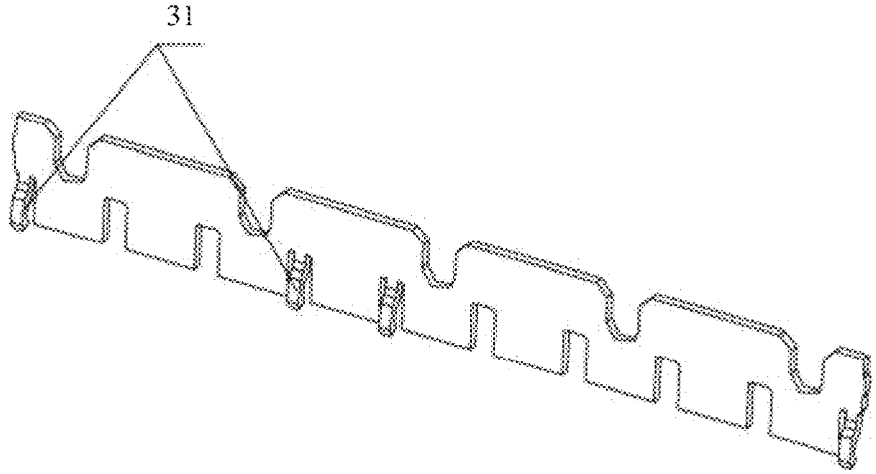
FIG. 3 is a schematic diagram of a structure of a metal shielding piece in the connector shown in FIG. 1.

FIG. 1 and FIG. 2 show a connector with a shielding function. As shown in FIG. 1 and FIG. 2, the connector includes an insulation base 1 and a terminal array 2 disposed on the insulation base 1, the terminal array 2 includes a plurality of rows of terminals, each row of terminals includes a plurality of signal terminal groups and a plurality of ground terminals, each signal terminal group includes two signal terminals, the two signal terminals are configured to transmit differential signals, a ground terminal is disposed between two adjacent signal terminal groups, the ground terminal is configured to shield differential signals transmitted by the two adjacent signal terminal groups, a metal shielding piece 3 is disposed between two adjacent rows of terminals, and the metal shielding piece 3 is configured to shield differential signals transmitted by the two adjacent rows of terminals. In this way, signal crosstalk is reduced by using the ground terminal and the metal shielding piece 3, so that performance of the connector is improved. As shown in FIG. 3, outward protruding springs 31 are disposed on the metal shielding piece 3. The metal shielding piece 3 abuts the ground terminal through the spring 31 to implement common grounding with the ground terminal. In this way, grounding and signal backflow of the ground terminal and the metal shielding piece 3 can be implemented by connecting the ground terminal to a ground connection line on a backplane or a board.

In the foregoing connector, the metal shielding piece 3 abuts the ground terminal through the spring 31, and the metal shielding piece 3 is in point-contact with the ground terminal. Therefore, grounding and signal backflow performance of the metal shielding piece 3 is relatively poor, and crosstalk of the connector is relatively severe.

In a current communications hardware system, a backplane interconnection system that is based on a printed circuit board and that includes a combination of a backplane and a board is a most common interconnection architecture, and is usually used in a high-speed link of a communications system. Various boards are connected to the backplane through connection assemblies. As a connection bridge between the backplane and the board, the connection assembly is a key part that affects the entire hardware system architecture.

An embodiment of this application provides a backplane interconnection system, including a backplane, at least one board, and at least one connection assembly. Each board is connected to the backplane through at least one connection assembly.

Figure 4:
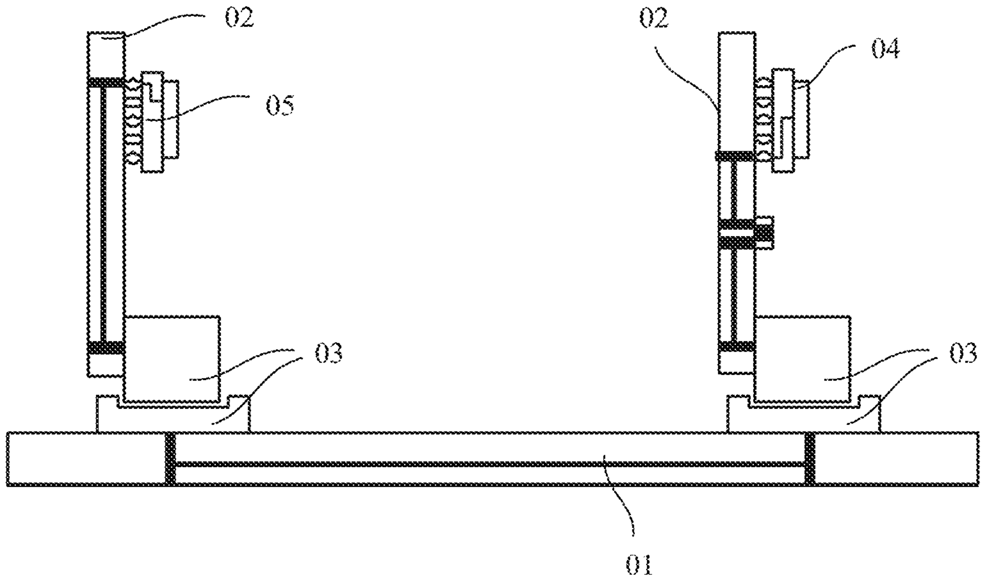
FIG. 4 is a schematic diagram of a structure of a backplane interconnection system according to an embodiment of this application.

For example, as shown in FIG. 4, the backplane interconnection system includes a backplane 01, two boards 02, at least two connection assemblies 03, a receiver chip 04, and a transmitter chip 05. Each board 02 is connected to the backplane 01 through at least one connection assembly 03. The receiver chip 04 is disposed on one board 02, and the transmitter chip 05 is disposed on another board 02.

Figure 5:
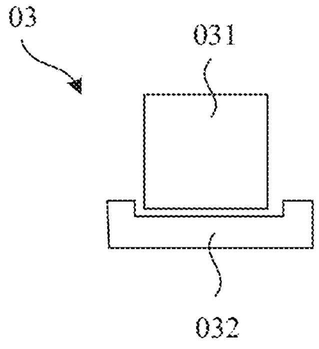
FIG. 5 is a schematic diagram of a structure of a connection assembly according to an embodiment of this application.

As shown in FIG. 5, the connection assembly 03 includes a first connector 031 and a second connector 032. One of the first connector 031 and the second connector 032 is connected to the backplane, the other of the first connector 031 and the second connector 032 is connected to a board, and the first connector 031 is cooperatively connected to the second connector 032.

Signal transmission between the first connector 031 and the backplane or the board is implemented by connecting a plurality of signal terminal groups of the first connector 031 to signal cables on the backplane or the board, signal transmission between the first connector 031 and the second connector 032 is implemented by connecting a plurality of signal terminal groups of the first connector 031 to a plurality of signal terminal groups of the second connector 032, and signal transmission between the second connector 032 and the board or the backplane is implemented by connecting a plurality of signal terminal groups of the second connector 032 to signal cables on the board or the backplane. Because different signal terminal groups are used to transmit different signals, the different signal terminal groups need to be isolated from each other to avoid signal crosstalk. Each signal terminal group includes at least one signal terminal.

Figure 6:
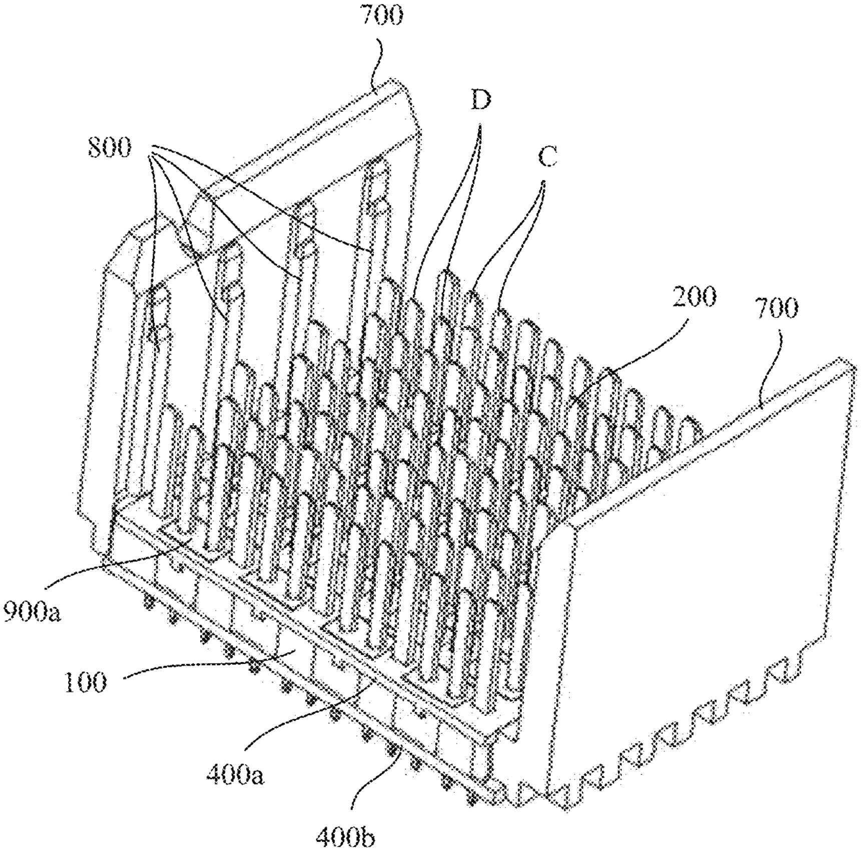
FIG. 6 is a schematic diagram of a structure of a connector according to an embodiment of this application.
Figure 7:
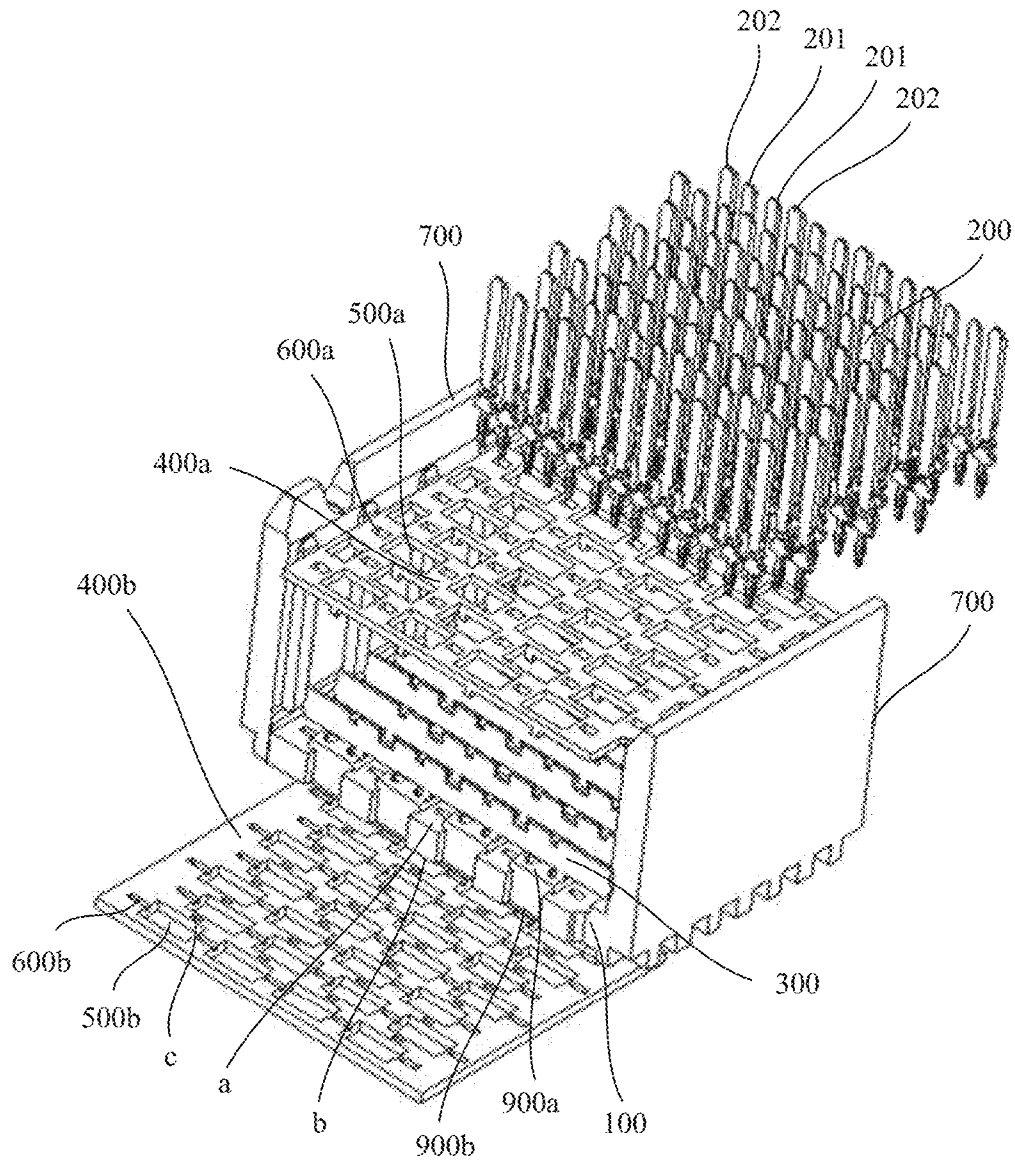
FIG. 7 is an exploded view of the connector shown in FIG. 6.

A structure of the first connector 031 and/or the second connector 032 may be as follows: As shown in FIG. 6 and FIG. 7, the structure includes an insulation base 100, a terminal array 200, a metal shielding piece 300, and a first common grounding conductor 400*a*. The insulation base 100 has a first surface a and a second surface b opposite to the first surface a. The terminal array 200 is fastened on the insulation base 100, the terminal array 200 includes a plurality of rows of terminals, each row of terminals includes a signal terminal 201 and a ground terminal 202, both the signal terminal 201 and the ground terminal 202 penetrate the insulation base 100, and a metal shielding piece 300 is disposed between two adjacent rows of terminals. The first common grounding conductor 400*a* is disposed on the first surface a. A first through hole 500*a* is disposed on the first common grounding conductor 400*a* at a position corresponding to the signal terminal 201. The signal terminal 201 penetrates the first through hole 500*a*, and is insulated from an inner wall of the first through hole 500*a*. A second through hole 600*a* is disposed on the first common grounding conductor 400*a* at a position corresponding to the ground terminal 202. The ground terminal 202 penetrates the second through hole 600*a*, and is in contact with and conducted with at least a part of an inner wall of the second through hole 600*a*. The metal shielding piece 300 is in contact with and conducted with the first common grounding conductor 400*a*.

It should be noted that when both the first connector 031 and the second connector 032 are of the connector structure described in the foregoing embodiment, a terminal in a terminal array 200 of the first connector 031 is one of a male terminal and a female terminal, and a terminal in a terminal array 200 of the second connector 032 is the other of the male terminal and the female terminal. In this way, the first connector 031 and the second connector 032 can be cooperatively connected to each other.

A connector provided in an embodiment of this application is shown in FIG. 6 and FIG. 7. The connector includes a terminal array 200, the terminal array 200 is fastened on an insulation base 100, and the terminal array 200 includes a plurality of rows of terminals. Each row of terminals includes a signal terminal 201 and a ground terminal 202. In this way, signal terminals 201 in each row of terminals can be shielded from each other by using a ground terminal 202. When the connector is connected to a backplane or a board, the ground terminal 202 is connected to a ground cable on the backplane or the board, to implement grounding and signal backflow. In addition, a metal shielding piece 300 is disposed between two adjacent rows of terminals, a first common grounding conductor 400*a* is disposed on a first surface a, a second through hole 600*a* is disposed on the first common grounding conductor 400*a* at a position corresponding to the ground terminal 202, the ground terminal 202 penetrates the second through hole 600*a* and is in contact with and conducted with at least a part of an inner wall of the second through hole 600*a*, and the metal shielding piece 300 is in contact with and conducted with the first common grounding conductor 400*a*. Therefore, the metal shielding piece 300 can be connected to the ground cable on the backplane or the board through the first common grounding conductor 400*a* and the ground terminal 202, so that two adjacent rows of signal terminals can be shielded from each other by using the metal shielding piece 300. In addition, a relatively large quantity of contact and conduction regions can be formed between the ground terminal 202 and the first common grounding conductor 400*a* and between the metal shielding piece 300 and the first common grounding conductor 400*a*. In this way, the metal shielding piece 300 has relatively good grounding and signal backflow performance, crosstalk between two adjacent rows of terminals is relatively low, and crosstalk of the connector is relatively low.

Because the first connector and/or the second connector used in the connection assembly in embodiments of this application are/is the connector described in the foregoing embodiment, the connectors can resolve a same technical problem and achieve a same expected effect.

Because the connection assembly used in the backplane interconnection system in embodiments of this application is the connection assembly described in the foregoing embodiment, the connection assemblies can resolve a same technical problem and achieve a same expected effect.

A shape of the insulation base 100 includes, but is not limited to, a block shape or a plate shape. Materials of the insulation base 100 include, but are not limited to, plastic, glass, and ceramics.

A shape of the metal shielding piece 300 includes, but is not limited to, a sheet shape or a strip shape. A material of the metal shielding piece 300 includes, but is not limited to, copper, iron, or aluminum.

The first common grounding conductor 400*a* may be directly molded on the first surface a, or may be independently molded and then fastened on the first surface a. This is not specifically limited herein.

The signal terminal 201 and the ground terminal 202 may be plug terminals, or may be spring terminals. This is not specifically limited herein.

It should be noted that, that the ground terminal 202 is in contact with and conducted with at least a part of an inner wall of the second through hole 600*a* means that the ground terminal 202 may be in contact with and conducted with all of the inner wall of the second through hole 600*a*, or may be in contact with and conducted with a part of the inner wall of the second through hole 600*a*.

In some embodiments, as shown in FIG. 6 and FIG. 7, a second common grounding conductor 400*b* is further disposed on the second surface b. A third through hole 500*b* is disposed on the second common grounding conductor 400*b* at a position corresponding to the signal terminal 201. The signal terminal 201 penetrates the third through hole 500*b* and is insulated from an inner wall of the third through hole 500*b*. A fourth through hole 600*b* is disposed on the second common grounding conductor 400*b* at a position corresponding to the ground terminal 202. The ground terminal 202 penetrates the fourth through hole 600*b* and is in contact with and conducted with at least a part of an inner wall of the fourth through hole 600*b*. In this way, signal backflow is performed on the ground terminal 202 by using two common grounding conductors (that is, the first common grounding conductor 400*a* and the second common grounding conductor 400*b*), so that signal backflow performance of the connector can be further improved.

The second common grounding conductor 400*b* may be directly molded on the second surface b, or may be independently molded and then fastened on the second surface b. This is not specifically limited herein.

That the ground terminal 202 is in contact with and conducted with at least a part of an inner wall of the fourth through hole 600*b* means that the ground terminal 202 may be in contact with and conducted with all of the inner wall of the fourth through hole 600*b*, or may be in contact with and conducted with a part of the inner wall of the fourth through hole 600*b*.

In some embodiments, as shown in FIG. 6 and FIG. 7, the metal shielding piece 300 is embedded in the insulation base 100, an end that is of the metal shielding piece 300 and that is close to the first surface a is in contact with and conducted with the first common grounding conductor 400*a*, and an end that is of the metal shielding piece 300 and that is close to the second surface b is in contact with and conducted with the second common grounding conductor 400*b*. In this way, signal backflow is performed on the metal shielding piece 300 by using two common grounding conductors (that is, the first common grounding conductor 400*a* and the second common grounding conductor 400*b*), so that signal backflow performance of the connector can be further improved.

In some embodiments, the metal shielding piece 300 has one of a protrusion and a groove, and the first common grounding conductor 400*a* has the other of the protrusion and the groove. The protrusion is cooperatively accommodated in the groove, and is in contact with and conducted with an inner wall of the groove. In this way, an area of contact between the metal shielding piece 300 and the first common grounding conductor 400*a* can be increased, so that signal backflow performance of the connector is further improved.

Figure 9:
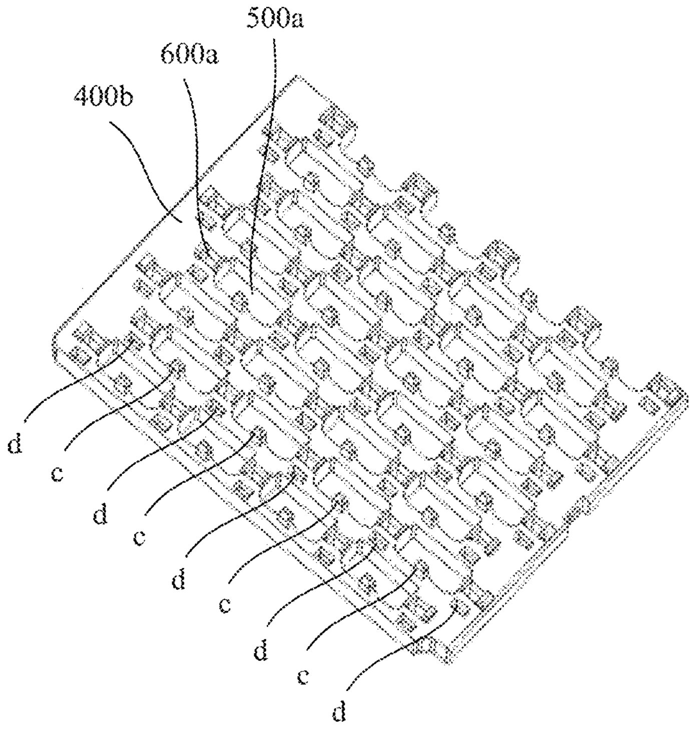
FIG. 9 is an entity diagram of a structure of a second common grounding conductor in a connector according to an embodiment of this application.
Figure 10:
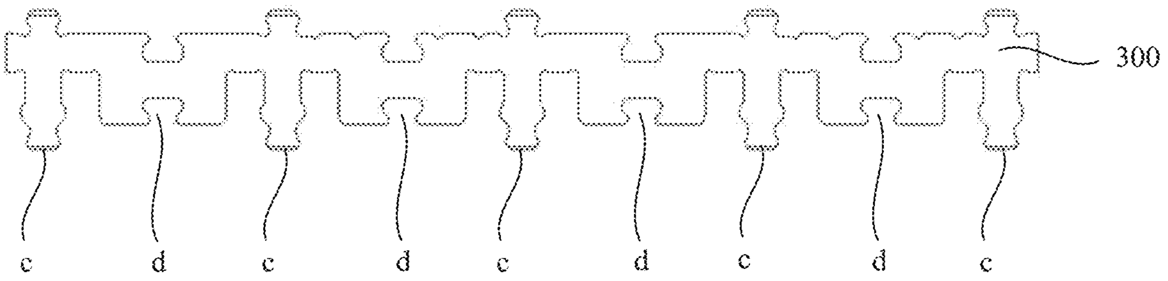
FIG. 10 is a schematic diagram of a structure of a metal shielding piece in a connector according to an embodiment of this application.

In some embodiments, as shown in FIG. 10, the metal shielding piece 300 has one of a protrusion c and a groove d, and as shown in FIG. 9, the second common grounding conductor 400*b* has the other of the protrusion c and the groove d. The protrusion c is cooperatively accommodated in the groove d, and is in contact with and conducted with an inner wall of the groove d. In this way, an area of contact between the metal shielding piece 300 and the second common grounding conductor 400*b* can be increased, so that signal backflow performance of the connector is further improved.

Figure 8:
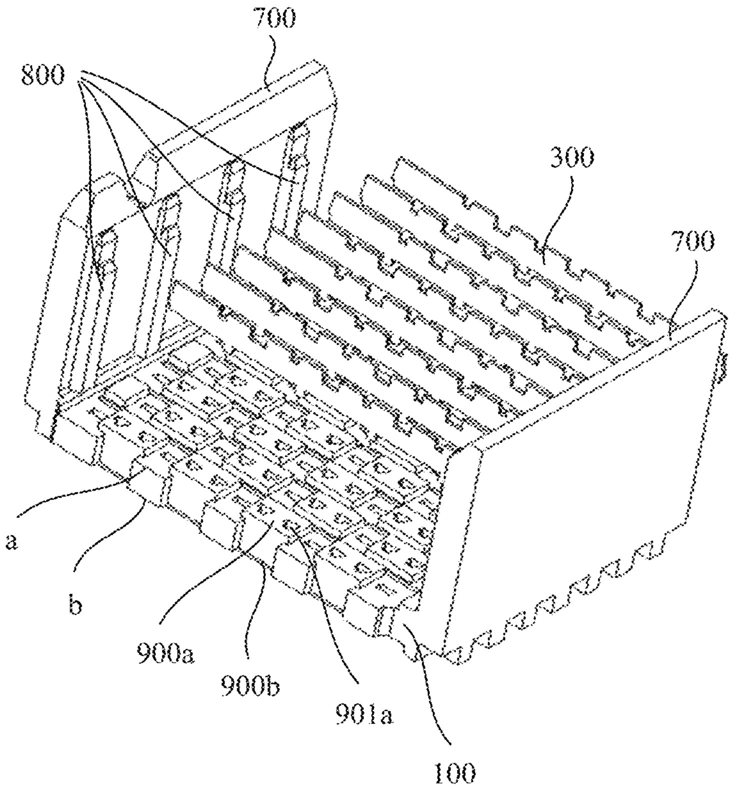
FIG. 8 is a schematic diagram of a structure of an insulation base and a metal shielding piece in a connector according to an embodiment of this application.

In some embodiments, as shown in FIG. 8, protection boards 700 are disposed on at least two opposite sides of the terminal array 200, and the protection board 700 is fastened on the insulation base 100. In this way, the terminal array 200 can be protected by using the protection board 700, to avoid scratching the terminal array 200.

In some embodiments, as shown in FIG. 8, the protection board 700 and the insulation base 100 are integrally molded. In this way, the connector provided in embodiments of this application includes a relatively small quantity of components, and assembly efficiency is relatively high.

In some embodiments, as shown in FIG. 8, both the signal terminal 201 and the ground terminal 202 are plug terminals, a plug direction of the signal terminal 201 is consistent with that of the ground terminal 202, a guide structure 800 is disposed on an inner surface of the protection board 700, and a guide direction of the guide structure 800 is consistent with the plug direction of the signal terminal 201 or the ground terminal 202. In this way, under guidance of the guide structure 800, the connector provided in embodiments of this application can be quickly inserted into another connector cooperating with the connector.

It should be noted that the inner surface of the protection board 700 is a surface that is of the protection board 700 and that faces the terminal array 200. The guide structure 800 may be a guide rib protruding from the inner surface of the protection board 700, or may be a guide sliding slot provided on the inner surface of the protection board 700. This is not specifically limited herein.

A gap may be disposed between the signal terminal 201 and the inner wall of the first through hole 500*a* to implement insulation by using the gap, or an insulation material may be used for insulation. This is not specifically limited herein. In some embodiments, as shown in FIG. 8, the connector further includes a first insulation and isolation piece 900*a*. As shown in FIG. 6, the first insulation and isolation piece 900*a* is cooperatively embedded in the first through hole 500*a*. In addition, a fifth through hole 901*a* (as shown in FIG. 8) is disposed on the first insulation and isolation piece 900*a*, and the signal terminal 201 cooperatively penetrates the fifth through hole 901*a*. In this way, insulation between the signal terminal 201 and the inner wall of the first through hole 500*a* is implemented by using the first insulation and isolation piece 900*a*, and insulation stability is relatively high. In addition, the signal terminal 201 is fastened by using the first insulation and isolation piece 900*a*, so that structure stability of the connector is improved.

A gap may be disposed between the signal terminal 201 and the inner wall of the third through hole 500*b* to implement insulation by using the gap, or an insulation material may be used for insulation. This is not specifically limited herein. In some embodiments, as shown in FIG. 8, the connector further includes a second insulation and isolation piece 900*b*. As shown in FIG. 7, the second insulation and isolation piece 900*b* is cooperatively embedded in the third through hole 500*b*. In addition, a sixth through hole (not shown in the figure) is disposed on the second insulation and isolation piece 900*b*, and the signal terminal 201 cooperatively penetrates the sixth through hole. In this way, insulation between the signal terminal 201 and the inner wall of the third through hole 500*b* is implemented by using the second insulation and isolation piece 900*b*, and insulation stability is relatively high. In addition, the signal terminal 201 is fastened by using the second insulation and isolation piece 900*b*, so that structure stability of the connector is improved.

In some embodiments, as shown in FIG. 8, the first insulation and isolation piece 900*a* and the insulation base 100 are integrally molded. In this way, the connector includes a relatively small quantity of components, and assembly efficiency is relatively high.

In some embodiments, as shown in FIG. 8, the second insulation and isolation piece 900*b* and the insulation base 100 are integrally molded. In this way, the connector includes a relatively small quantity of components, and assembly efficiency is relatively high.

In some embodiments, as shown in FIG. 6 and FIG. 7, in each row of terminals, signal terminals 201 form a plurality of signal terminal groups, each signal terminal group includes at least one signal terminal 201, and a ground terminal 202 is disposed between two adjacent signal terminal groups. In this way, signals transmitted by the two adjacent signal terminal groups are shielded from each other by using the ground terminal 202, signal crosstalk is reduced, and performance of the connector is improved.

Each signal terminal group is configured to transmit one signal. The signal terminal group may include one signal terminal 201, or may include two signal terminals 201. This is not specifically limited herein. In some embodiments, as shown in FIG. 6 and FIG. 7, each signal terminal group includes two signal terminals 201. In this way, the signal terminal group can transmit two differential signals having equal amplitudes and opposite phases, and the differential signals have a strong anti-electromagnetic interference capability, so that anti-electromagnetic interference performance of the connector can be improved.

Figure 11:
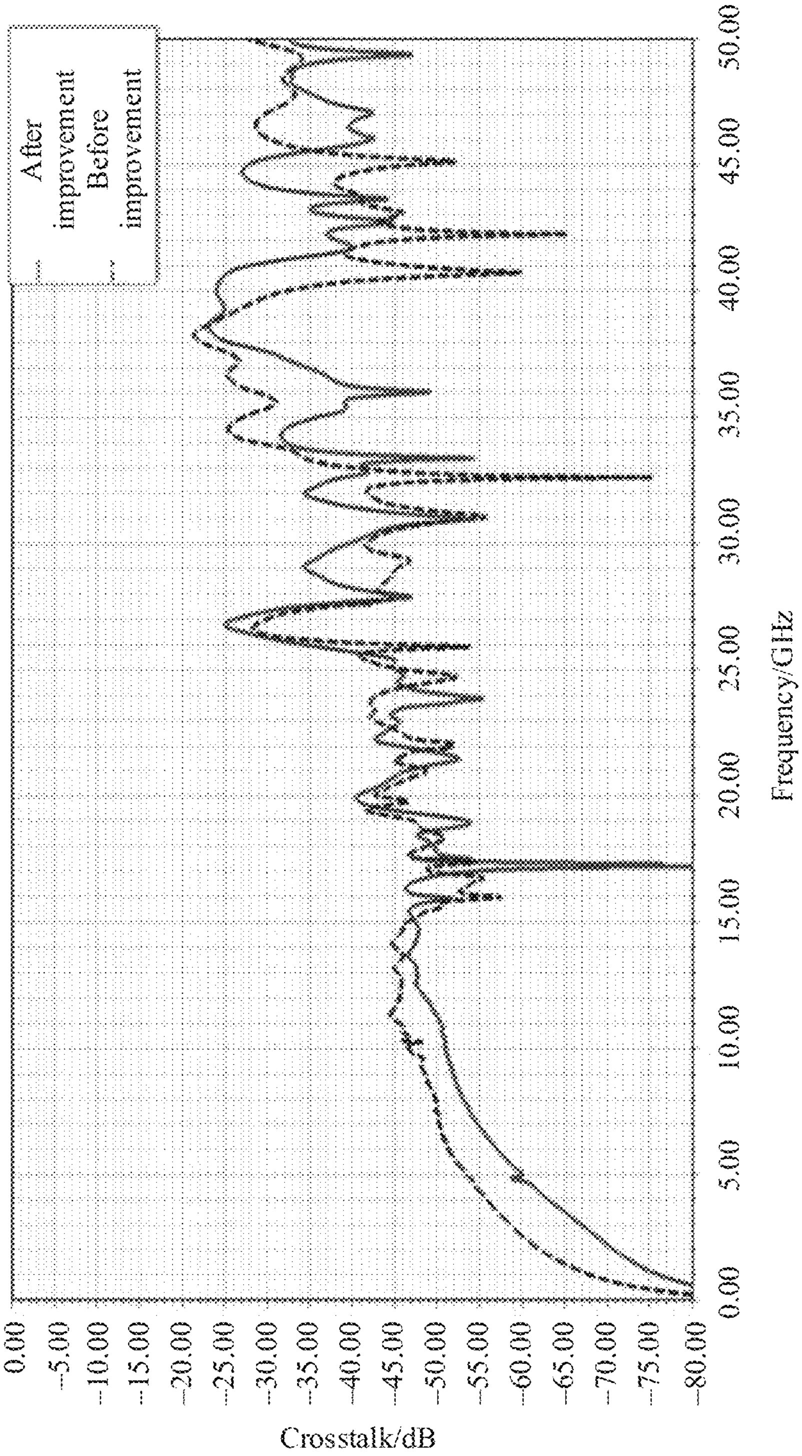
FIG. 11 is a diagram of comparison between a simulation result of crosstalk between a signal terminal group A and a signal terminal group B in the connector shown in FIG. 2 and a simulation result of crosstalk between a signal terminal group C and a signal terminal group D in the connector shown in FIG. 6.

Connectors shown in FIG. 2 and FIG. 6 are separately connected to a backplane or a board, and ground terminals in the connectors shown in FIG. 2 and FIG. 6 are connected to a ground cable on the backplane or the board. Then, crosstalk between a signal terminal group A and a signal terminal group B separated by a metal shielding piece 3 in the connector shown in FIG. 2 is simulated (that is, a case before improvement in FIG. 11), crosstalk between a signal terminal group C and a signal terminal group D separated by the metal shielding piece 300 in the connector shown in FIG. 6 is simulated (that is, a case after improvement in FIG. 11), and simulation results are recorded in FIG. 11. It can be learned from FIG. 11 that, compared with the connector shown in FIG. 2, the connector shown in FIG. 6 can achieve a gain of 3 to 5 dB in near-end crosstalk below 15 GHz. Therefore, it can be learned that the connector provided in embodiments of this application can reduce crosstalk.

In the descriptions of this specification, the specific features, structures, materials, or characteristics may be combined in an appropriate manner in any one or more embodiments or examples.

Finally, it should be noted that, the foregoing embodiments are merely intended to describe the technical solutions of this application, but not to limit this application. Although this application is described in detail with reference to the foregoing embodiments, persons of ordinary skill in the art should understand that they may still make modifications to the technical solutions recorded in the foregoing embodiments or make equivalent replacements to some technical features thereof, without departing from the spirit and scope of the technical solutions of the embodiments of this application.

What is claimed is:

1. A connector, comprising:

an insulation base having a first surface and a second surface opposite to the first surface;

a terminal array located on the insulation base, wherein the terminal array comprises a first terminal group and a second terminal group, the first terminal group comprises a signal terminal and a ground terminal that penetrate the insulation base;

a metal shielding piece located between the first terminal group and the second terminal group; and a first common grounding conductor located on the first surface, wherein the signal terminal penetrates the first common grounding conductor at a position corresponding to the signal terminal and is insulated from the first common grounding conductor, the ground terminal is electrically connected to the first common grounding conductor, and the metal shielding piece is electrically connected to the first common grounding conductor.

2. The connector according to claim 1, further comprising a second common grounding conductor disposed on the second surface, wherein the signal terminal penetrates the second common grounding conductor and is insulated from the second common grounding conductor, and wherein the ground terminal penetrates the second common grounding conductor and is electrically connected to the second common grounding conductor.

3. The connector according to claim 1, wherein the metal shielding piece is embedded in the insulation base.

4. The connector according to claim 2, wherein the metal shielding piece comprises a first end close to the first surface in contact and conducted with the first common grounding conductor, and the metal shielding piece comprises a second end close to the second surface in contact and conducted with the second common grounding conductor.

5. The connector according to claim 1, wherein the metal shielding piece has one of a protrusion and a groove, and the protrusion is cooperatively accommodated in the groove and is in contact with and conducted with an inner wall of the groove.

6. The connector according to claim 1, wherein protection boards are disposed on at least two opposite sides of the terminal array, and the protection boards are fastened on the insulation base.

7. The connector according to claim 6, wherein both the signal terminal and the ground terminal are plug terminals, a plug direction of the signal terminal is consistent with that of the ground terminal, a guide structure is disposed on an inner surface of the protection board, and a guide direction of the guide structure is consistent with the plug direction of one of (a) and (b): (a) the signal terminal, (b) the ground terminal.

8. The connector according to claim 1, further comprising an insulation and isolation piece, wherein the insulation and isolation piece is configured to insulate the signal terminal from the first common grounding conductor.

9. The connector according to claim 8, wherein the insulation and isolation piece and the insulation base are integrally molded.

10. The connector according to claim 1, wherein the first terminal group is adjacent to the second terminal group.

11. The connector according to claim 1, wherein the insulation base is one of: block-shaped and sheet-shaped.

12. The connector according to claim 1, wherein the metal shielding piece is one of: sheet-shaped and strip-shaped.

13. The connector according to claim 1, wherein the signal terminal is one of: a plug terminal and a spring terminal.

14. The connector according to claim 1, wherein the first common grounding conductor is one of (a) and (b): (a) integrally molded on the first surface, (b) fastened on the first surface after being independently molded.

15. The connector according to claim 4, wherein the second common grounding conductor is one of (a) integrally molded on the second surface and (b) fastened on the second surface after being independently molded.

16. A connector, comprising:

an insulation base having a first surface and a second surface opposite to the first surface;

a terminal array fastened on the insulation base, wherein the terminal array comprises a plurality of rows of terminals, each row of terminals comprises a signal terminal and a ground terminal that penetrate the insulation base, and a metal shielding piece is disposed between two adjacent rows of terminals; and a first common grounding conductor disposed on the first surface, wherein a first through hole is disposed on the first common grounding conductor at a position corresponding to the signal terminal, the signal terminal penetrates the first through hole and is insulated from an inner wall of the first through hole, a second through hole is disposed on the first common grounding conductor at a position corresponding to the ground terminal, the ground terminal penetrates the second through hole and is in contact with and conducted with at least a part of an inner wall of the second through hole, and the metal shielding piece is in contact with and conducted with the first common grounding conductor.

17. The connector according to claim 16, wherein a second common grounding conductor is further disposed on the second surface; and a third through hole is disposed on the second common grounding conductor at a position corresponding to the signal terminal, the signal terminal penetrates the third through hole and is insulated from an inner wall of the third through hole, a fourth through hole is disposed on the second common grounding conductor at a position corresponding to the ground terminal, and the ground terminal penetrates the fourth through hole and is in contact with and conducted with at least a part of an inner wall of the fourth through hole.

18. The connector according to claim 17, wherein the metal shielding piece is embedded in the insulation base, and the metal shielding piece comprises a first end close to the first surface in contact and conducted with the first common grounding conductor, and a second end close to the second surface in contact and conducted with the second common grounding conductor.

19. The connector according to claim 16, wherein the metal shielding piece has one of a protrusion and a groove, the first common grounding conductor has the other of the protrusion and the groove, and the protrusion is cooperatively accommodated in the groove and is in contact with and conducted with an inner wall of the groove.

20. A backplane interconnection system, comprising:

at least one connection assembly having a first connector and a second connector, wherein the first connector comprises:

an insulation base having a first surface and a second surface opposite to the first surface, a terminal array located on the insulation base, wherein the terminal array comprises a first terminal group and a second terminal group, the first terminal group comprises a signal terminal and a ground terminal that penetrate the insulation base, a metal shielding piece located between the first terminal group and the second terminal group, and a common grounding conductor located on the first surface, wherein the signal terminal penetrates the common grounding conductor at a position corresponding to the signal terminal and is insulated from the common grounding conductor, the ground terminal is electrically connected to the common grounding conductor, and the metal shielding piece is electrically connected to the common grounding conductor;

a backplane; and at least one board connected to the backplane through the at least one connection assembly.

* * * * *